(12) United States Patent
Marcoe et al.

(10) Patent No.: US 12,157,572 B2
(45) Date of Patent: Dec. 3, 2024

(54) METHOD OF MAKING A CONTROL SURFACE

(71) Applicant: The Boeing Company, Chicago, IL (US)

(72) Inventors: Jeffery Lee Marcoe, Bellevue, WA (US); Marc Rollo Matsen, Seattle, WA (US); Waeil Ashmawi, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 327 days.

(21) Appl. No.: 17/446,550

(22) Filed: Aug. 31, 2021

(65) Prior Publication Data

US 2023/0061907 A1   Mar. 2, 2023

(51) Int. Cl.
| | |
|---|---|
| *B64C 9/00* | (2006.01) |
| *B29D 99/00* | (2010.01) |
| *B64C 3/18* | (2006.01) |
| *B64C 3/26* | (2006.01) |

(52) U.S. Cl.
CPC ............ *B64C 9/00* (2013.01); *B29D 99/0028* (2013.01); *B64C 3/185* (2013.01); *B64C 3/26* (2013.01)

(58) Field of Classification Search
CPC .. B64C 9/00; B64C 3/185; B64C 3/26; B64C 2009/005; B29D 99/0028; Y02T 50/40
See application file for complete search history.

(56) References Cited

U.S. PATENT DOCUMENTS

| | | | | |
|---|---|---|---|---|
| 4,304,376 A | | 12/1981 | Hilton | |
| 4,657,615 A | * | 4/1987 | Braun | B64C 3/185 |
| | | | | 156/173 |
| 5,500,511 A | | 3/1996 | Hansen et al. | |
| 5,710,414 A | * | 1/1998 | Matsen | B32B 37/06 |
| | | | | 219/645 |
| 6,638,466 B1 | * | 10/2003 | Abbott | B29C 33/68 |
| | | | | 264/258 |
| 8,973,871 B2 | | 3/2015 | Matsen et al. | |
| 9,358,703 B2 | | 6/2016 | Matsen et al. | |
| 9,469,087 B2 | | 10/2016 | Matsen et al. | |
| 9,662,742 B2 | | 5/2017 | Matsen et al. | |
| 10,358,821 B2 | | 7/2019 | Cawthorne et al. | |
| 11,046,420 B2 | | 6/2021 | Walker et al. | |
| 2004/0145080 A1 | | 7/2004 | Tanaka | |
| 2007/0289700 A1 | * | 12/2007 | Nelson | B29C 70/202 |
| | | | | 156/193 |

(Continued)

FOREIGN PATENT DOCUMENTS

| | | |
|---|---|---|
| EP | 2842867 A1 | 3/2015 |
| WO | 2008124352 A1 | 10/2008 |

OTHER PUBLICATIONS

Matsen, "Energy Efficient Thermoplastic Manufacturing," U.S DOE Advanced Manufacturing Office Program Review Meeting, Washington D.C., Jun. 11-12, 2010, 9 pages.

(Continued)

*Primary Examiner* — Christopher W Raimund
(74) *Attorney, Agent, or Firm* — Yee & Associates, P.C.

(57) ABSTRACT

A thin, lightweight control surface is fabricated by induction consolidation of thermoplastic components. The control surface includes a forward section co-consolidated with a rear section. The front section includes a cover and the rear section includes a truss core covered by an outer skin.

25 Claims, 15 Drawing Sheets

FIG. 17

(56) References Cited

U.S. PATENT DOCUMENTS

| | | | |
|---|---|---|---|
| 2008/0245927 A1* | 10/2008 | Kulesha | B64C 3/187 244/123.1 |
| 2008/0245928 A1* | 10/2008 | Kulesha | B64C 3/187 244/123.1 |
| 2018/0022438 A1 | 1/2018 | Crespo Pena et al. | |
| 2018/0086429 A1 | 3/2018 | Sheppard et al. | |
| 2020/0298500 A1 | 9/2020 | Koehn et al. | |
| 2021/0187796 A1 | 6/2021 | Marcoe et al. | |
| 2021/0187874 A1 | 6/2021 | Marcoe et al. | |
| 2021/0187878 A1 | 6/2021 | Marcoe et al. | |
| 2021/0188461 A1 | 6/2021 | Marcoe et al. | |

OTHER PUBLICATIONS

Matsen et al., "Induction Consolidation/Molding of Thermoplastic Composites Using Smart Susceptors," Final Technical Report, Office of Scientific & Technical Information Report No. 1043163, Jun. 14, 2012, 81 pages.

Marcoe et al., "Thermoplastic Skin Panels, Torque Box and Method," U.S. Appl. No. 17/659,671, filed Apr. 19, 2022, 26 pages.

European Patent Office, Partial Search Report, dated Nov. 23, 2022, regarding Application No. EP22179474.6, 13 pages.

Office Action dated Dec. 6, 2023, regarding U.S. Appl. No. 17/659,671, 21 pages.

European Patent Office, Extended Search Report, dated Mar. 10, 2023, regarding Application No. EP22179474.6, 11 pages.

* cited by examiner

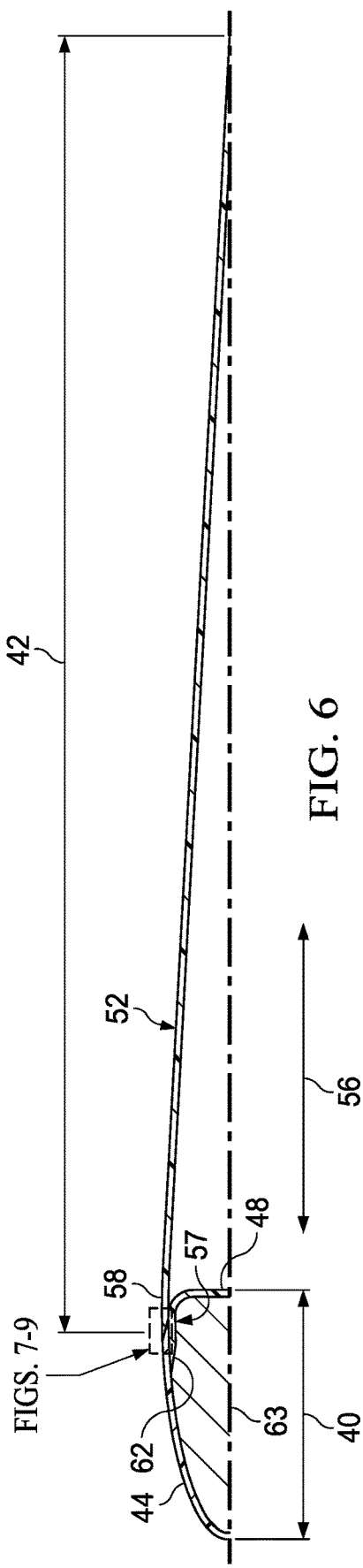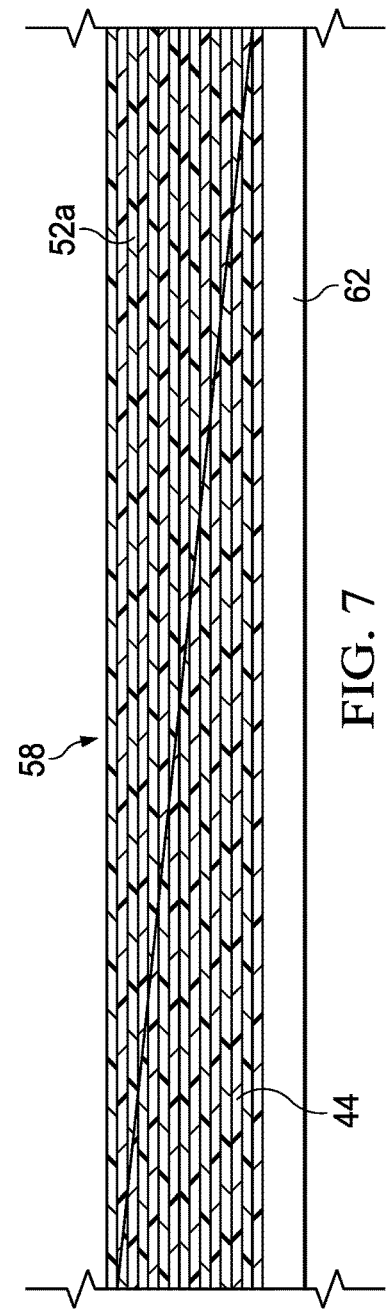

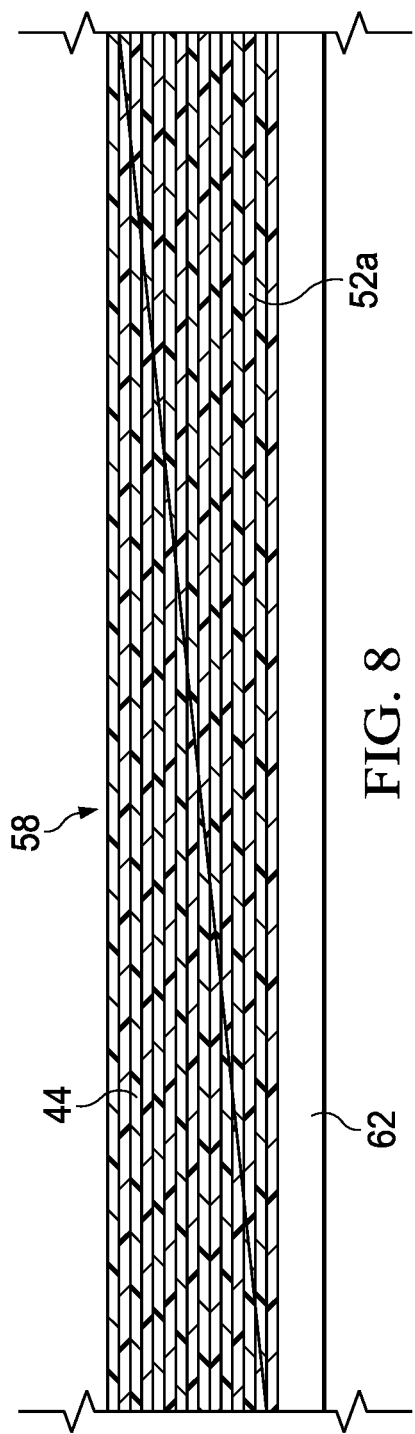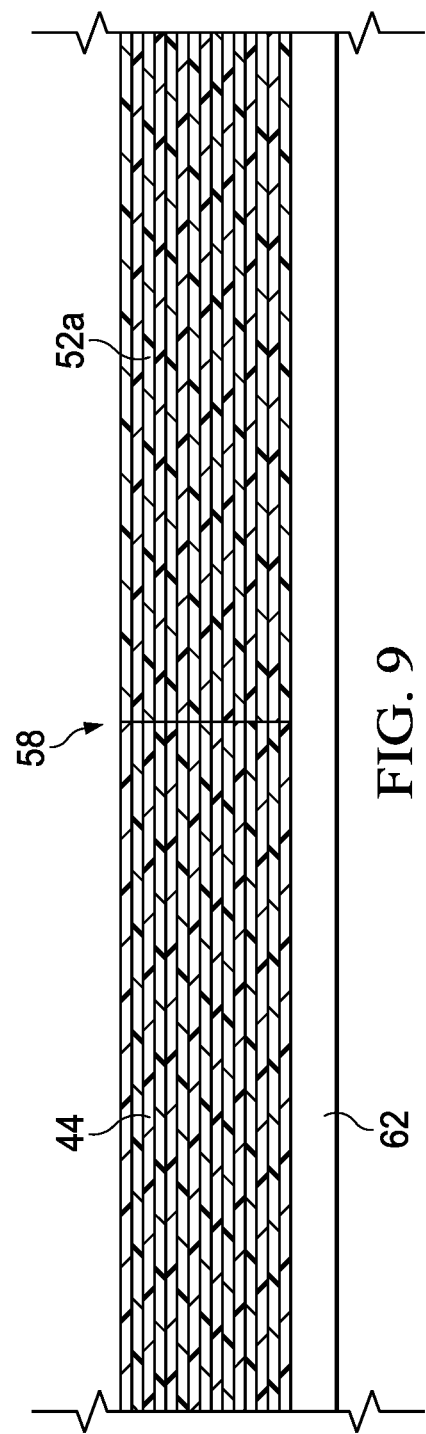

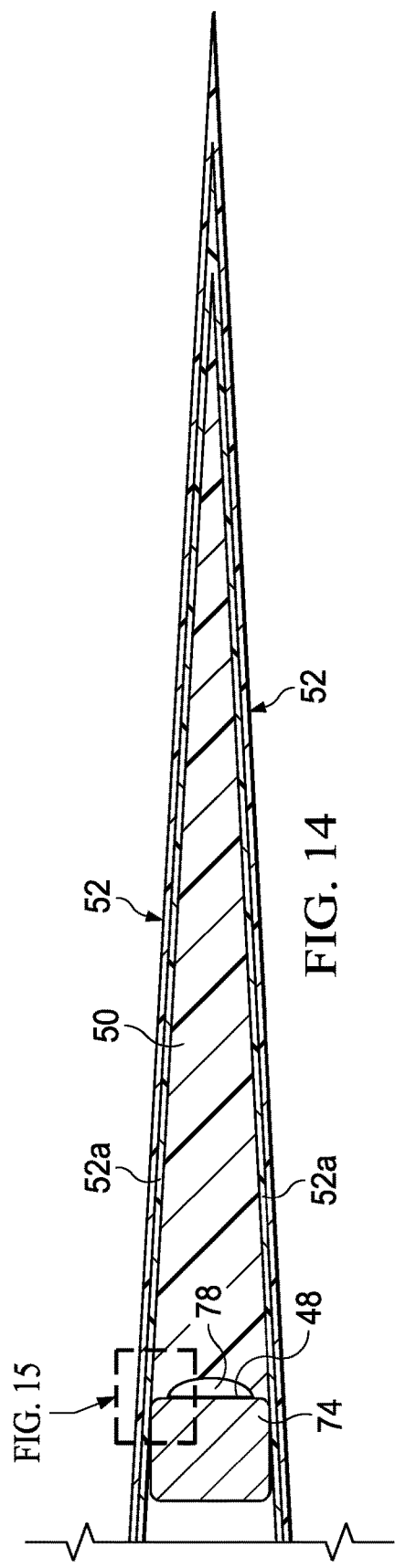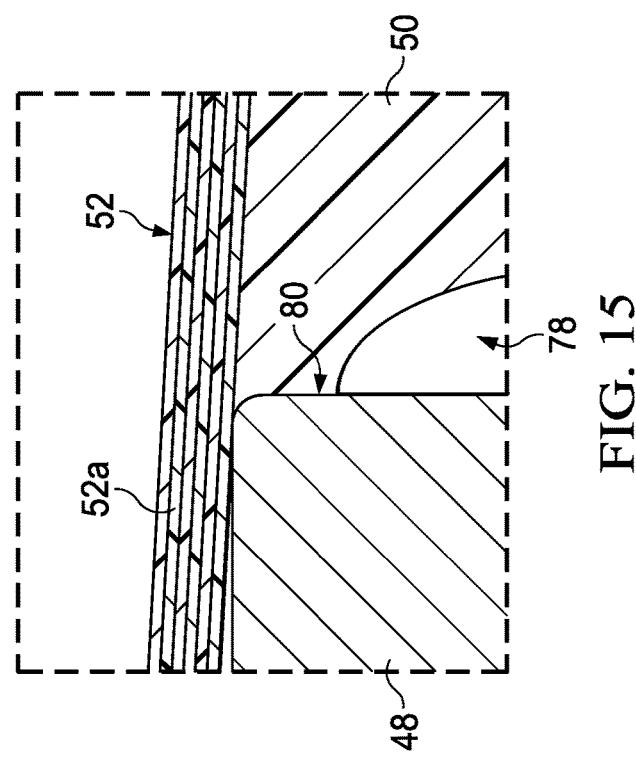

METHOD OF MAKING A CONTROL SURFACE

BACKGROUND INFORMATION

1. Field

The present disclosure generally relates to composite aircraft structures, and deals more particularly with a control surface formed of co-consolidated thermoplastic components, as well as a method of making the control surface using induction consolidation.

2. Background

Control surfaces for aircraft are sometimes produced using composite materials in which a honeycomb core is sandwiched between two outer facesheets, all formed from thermoset materials. The honeycomb core and the facesheets are co-cured at relatively low pressures and temperatures in an autoclave, resulting in a continuous attachment of the facesheets to the honeycomb core across the entire area of the control surface. This continuous attachment makes the control surface more subject to propagation of disbonds between the facesheets and the core. Control surfaces made from thermosets are also time consuming to produce because of the time needed for curing. While control surfaces of the type described above are satisfactory for many applications, they may not be suitable for newer applications where wings are thinner yet require greater fracture toughness and residual strength, particularly when operating at higher in-service temperatures.

Accordingly, there is a need a control surface that is relatively easy to fabricate and which possesses higher structural performance characteristics, particularly at higher in-service temperatures. There is also a need for a method of making such control surfaces at higher production rates.

SUMMARY

The disclosure relates in general to composite structures used in aircraft, and more specifically to a light weight control surface exhibiting high residual strength, improved fracture toughness properties, and damage tolerance.

According to one aspect, a control surface for a wing of an airplane is provided. The control surface comprises a forward section and aft section. The forward section includes a cover formed of thermoplastic.

According to another aspect, a control surface is provided for a wing of an airplane. The control surface comprises a truss core, and a skin covering the truss core. The control surface further comprises a cover configured to cover an end of the trust core.

According to still another aspect, a method is provided of making a control surface for an aircraft. The method comprises fabricating first and second sections of the control surface and assembling them together. Fabricating the first section includes fabricating a cover, fabricating a spar and attaching the spar to the cover. Fabricating the second section comprises fabricating a truss core and applying a skin over the truss core.

According to another aspect, a method is provided of making a control surface for an aircraft, comprising fabricating a cover, a spar, a truss core, and applying a skin over the truss core. The cover and the spar are welded together.

One of the advantages of the disclosed control surface is that it is relative thin and lightweight yet exhibits higher residual strength and improved fracture toughness properties as well as damage tolerance. A further advantage is that the control surface can be operated at higher in-service temperatures. Another advantage is that control surface can be more easily fabricated at higher production rates.

The features, functions, and advantages can be achieved independently in various examples of the present disclosure and can be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

FIG. 6 is an illustration of a cross sectional view of the upper half of the control surface.

FIG. 7 is an illustration of a cross-sectional view of the area designated as "FIG. 7" in FIG. 5, showing one form of a joint between the spar and the cover.

FIG. 8 is an illustration similar to FIG. 7 but showing another form of the joint.

FIG. 9 is an illustration similar to FIG. 7, but showing a further form of the joint.

FIG. 14 is an illustration of a view similar to FIG. 12 but showing a portion of the truss core having been cut away to form spar contact areas.

FIG. 15 is an illustration of the area designated as "FIG. 14" in FIG. 14.

DETAILED DESCRIPTION

Figure 1:
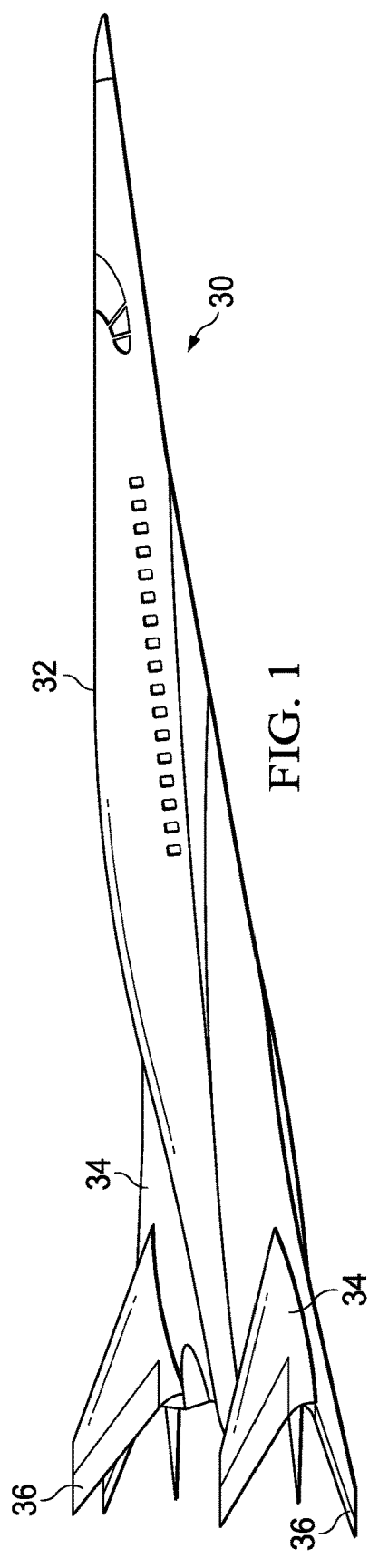
FIG. 1 is an illustration of a perspective view of a supersonic airplane employing control surfaces.

Referring first to FIG. 1, an aircraft 30 includes a fuselage 32 and wings 34, some of which include control surfaces 36 used to control the roll, pitch, yaw or other dynamics of the aircraft 30. In the illustrated example, the aircraft 30 is designed to achieve supersonic (in excess of Mach 1) speeds. However, it is possible to use principles of the control surfaces 36 described below in a variety of aircraft operated at subsonic speeds. As used herein, "control surface" includes but is not limited to ailerons, elevators, rudders, elevons, ailerons, flapperons, and similar structures such as small wings.

Figure 2:
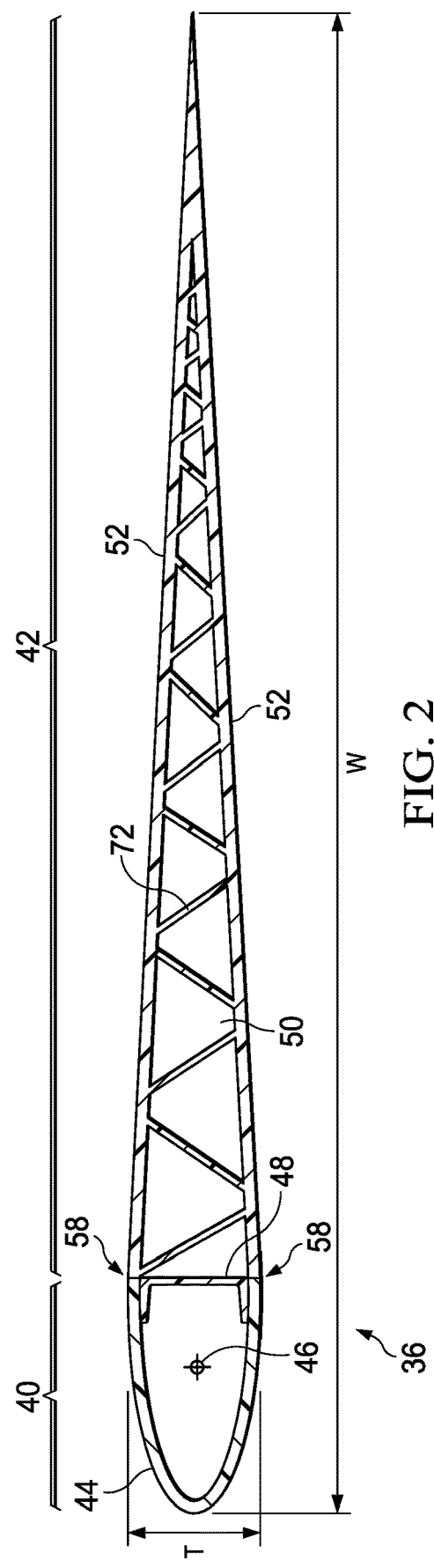
FIG. 2 is an illustration of a chordwise cross-sectional view of a control surface.
Figure 3:
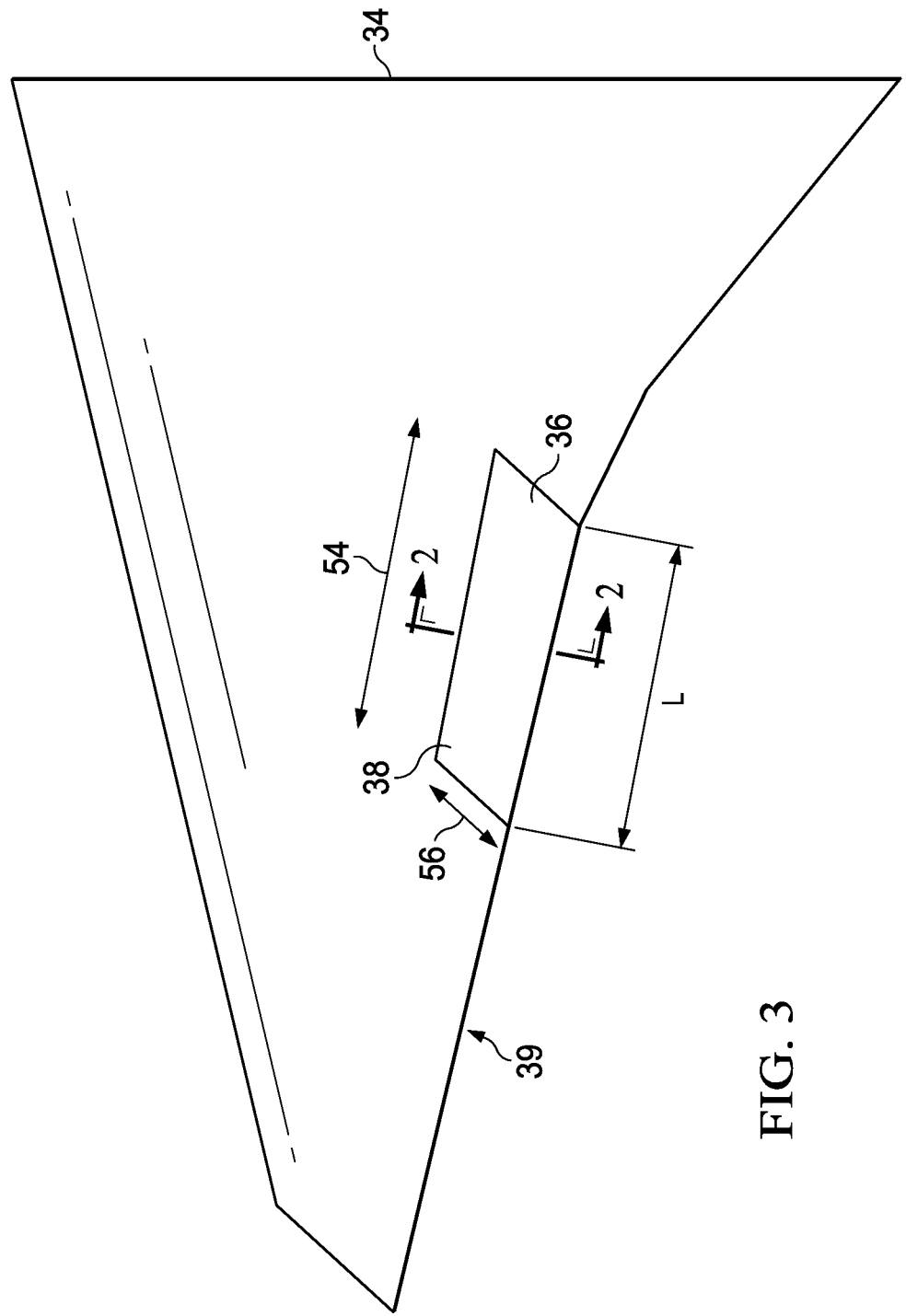
FIG. 3 is an illustration of a plan view of an aircraft wing employing an elevon.
Figure 4:
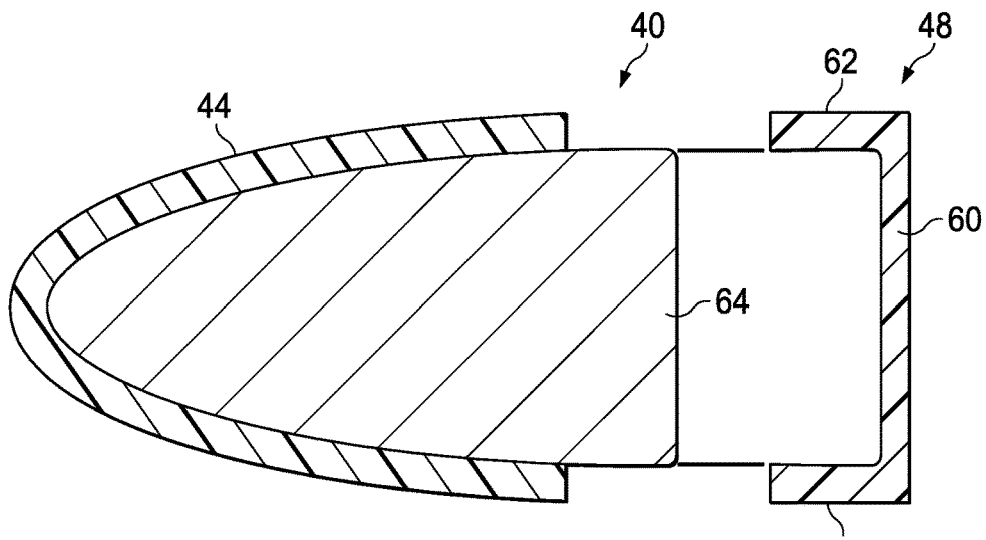
FIG. 4 is an illustration of an exploded, chordwise cross-sectional view showing a spar in readiness to be mounted on a layup mandrel.

FIGS. 2 and 3 illustrate a control surface 36 of the aircraft 30 in the form of elevon 38 located along the trailing edge 39 of a wing 34. The control surface 36 has a length L (FIG. 3) extending in the spanwise direction 54 of the wing 34, and a width W extending in the chordwise direction 56. In supersonic aircraft applications, the control surface 36 will typically have a thickness T that is relatively thin in order to reduce aerodynamic drag, particularly at supersonic speeds. The width W of the control surface 36 will depend on the particular application.

Referring particularly to FIG. 2, the control surface 36 broadly comprises a forward section 40 and an aft section 42 connected together at joints 58. Each of the forward and aft sections 40, 42 is formed of fiber reinforced thermoplastic components, such as for example and with limitation carbon fiber reinforced PEEK (polyether ether ketone) or PEKK (polyetherketoneketone) although it is possible to form certain of these components formed of other materials, depending on the application. As will be described below, the thermoplastic components of the control surface 36 are co-consolidated to form a highly integrated, thin, lightweight control surface structure having superior residual strength, fracture toughness and damage tolerance that is suitable for operation in high temperature environments.

Portions of the control surface 36 in the spanwise direction 54 may be stationarily fixed to the wing 34, while other portions are hinged for rotation about an axis 46 extending in the spanwise direction 54. The forward section 40 of the control surface 36 comprises a cover 44 joined to a spar 48 having a generally C-shaped cross-section. The cover 44 forms a leading edge having a rounded shape that enhances the bending resistance of the forward section 40. In one example, the cover 44 is formed of a carbon fiber reinforced thermoplastic fabric, and the spar 48 is formed of a carbon fiber reinforced thermoplastic tape, however in other examples the use of other forms of fiber reinforced thermoplastics is possible. The aft section 42 of the control surface 36 is tapered in the chordwise direction 56, and includes an outer skin 52 that is stiffened by an internal truss core 50. The outer skin 52 is formed of multiple facesheets and extends over the entire control surface 36, forming a smooth transition between the forward section 40 and the aft section 42. The truss core 50 provides the control surface 36 with improved bending stiffness and torsional resistance. The design of the truss core 50 can vary with the application, but in the illustrated example, comprises top and bottom chords 68, 70, respectively joined together by angularly oriented webs 72. In the illustrated example, the webs 72 extend in the spanwise direction 54 of the control surface 36. Alternatively however, in other examples, the webs 72 extend in the chordwise direction 56. The truss core 50 is either tapered or has a constant thickness in the spanwise direction 54 in those examples where the webs 72 extend in the spanwise direction 54. Similarly, in those examples in which the webs 72 extend the chordwise direction 56, the truss core 50 is either tapered or has a constant thickness in the chordwise direction 56. In some forms of the truss core 50, the webs 72 comprises thermoplastic composite doublers that are arraigned substantially perpendicular to the chords 68, 70. Still other configurations of the webs 60 are possible. In the illustrated example, the truss core 50 extends through the full thickness of the aft section 42, however in other examples, it extends only partially through the thickness of the aft section 42.

The chords 68, 70, and the webs 72 are formed of multi-ply carbon fiber reinforced thermoplastic tape, while the skin 52 comprises outer facesheets formed of multi-ply carbon fiber reinforced thermoplastic tape or fabric. However, it is possible to form the chords 68, 70, webs 72 and the skin 52 from other forms of fiber reinforced thermoplastic materials. The chords 68, 70 and webs 72 are laid up and co-consolidated using for example, induction heating employing smart susceptors (described later) which allow precise temperature control and short consolidation times.

Figure 5:
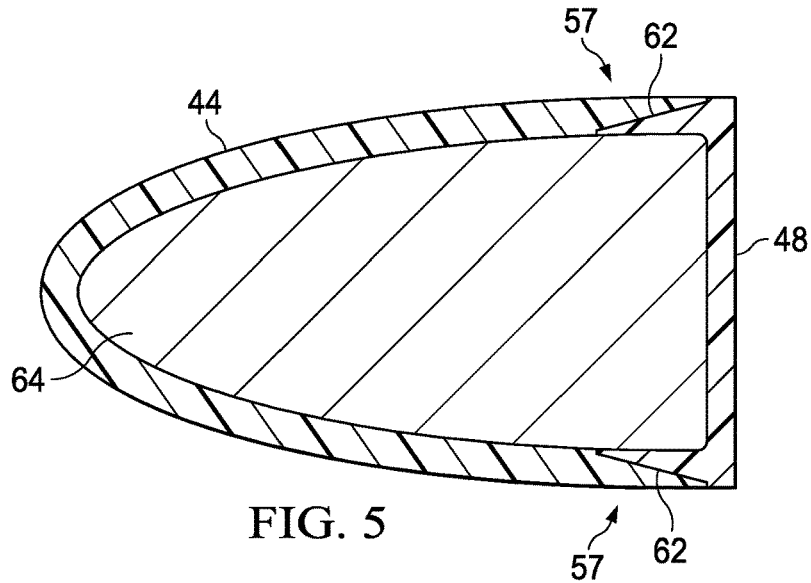
FIG. 5 is an illustration similar to FIG. 4, but showing the spar having been placed on the layup mandrel and a cover having been laid up on the layup mandrel.
Figure 5A:
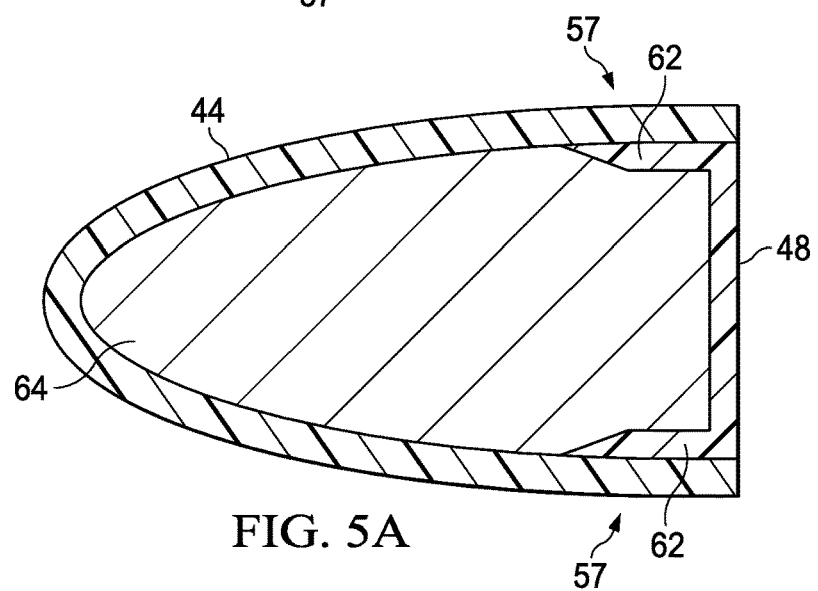
FIG. 5A is an illustration similar to FIG. 5 but showing an alternate placement of the spar on the layup mandrel relative to the cover.

Referring now to FIGS. 4, 5, 5A, and 6, the control surface 36 has an axis of symmetry 63 (FIG. 6). The cover 44 is formed over a layup mandrel 64 by either manual, semi-automated or fully automated application techniques in which multiple plies of fiber reinforced thermoplastic fabric are placed over the mandrel 64. The spar 48 comprises a web 60 and a pair of caps 62 that are configured to be connected to the cover 44 along joints 57, as by consolidation through induction heating or other techniques. Any of several configurations of the joints 57 are possible, but in the illustrated example, as best seen in FIGS. 5A and 6, the joints 57 are in the form of a lap joint 57 in which the cover 44 overlaps the caps 62 of the spar 48.

The forward section 40 is connected to the aft section 42 at joints 58 which are in any of several forms. For example, as shown in FIGS. 6 and 7, the joints 58 comprise a scarf joint 58 in which tapered forwardly extending tabs 52a of the skin 52 on the aft section 42 overlap tapered rear ends of the skin 52 on the cover 44. Alternatively, as shown in FIG. 8, the scarf joint 58 is formed by overlapping the tapered rear ends of the skin 52 on the cover 44 over the tabs 52a of the skin 52 on the aft section 42. Further, as shown in FIG. 9, the joint 58 each comprise a simple butt joint in the skin 52 between the forward section 40 and the aft section 42. In each example, the caps 62 are located beneath and span the joints 58, thereby strengthening them. Other types of joints are possible, such as, without limitation, step lap joints, simple lap joints, and double butt lap joints to name only a few. The forward section 40 and the aft section 42 are joined together at the joints 58 either by co-consolidation or by induction welding.

Figure 10:
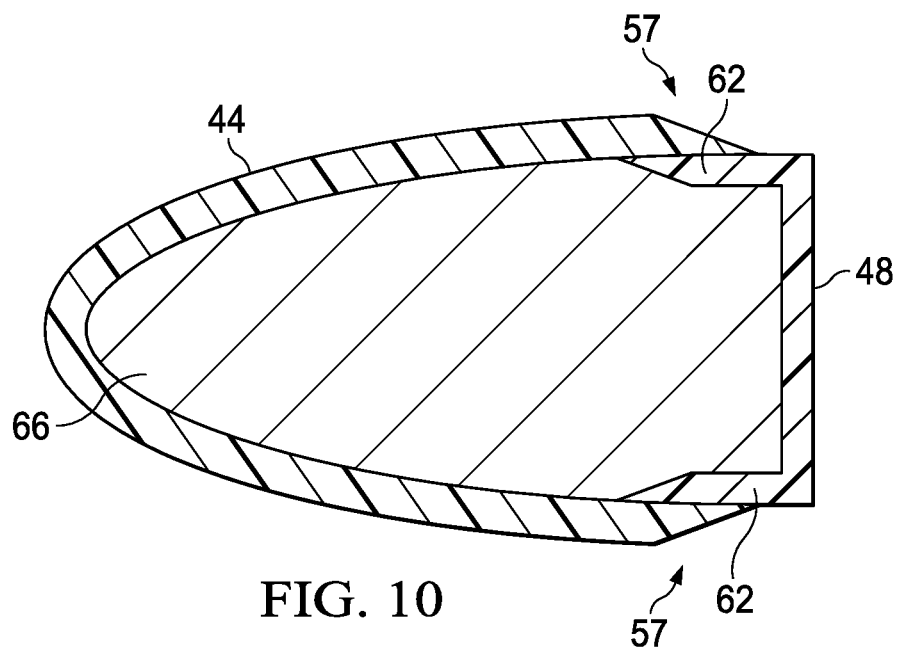
FIG. 10 is an illustration similar to FIG. 6 but wherein the layup mandrel has been replaced by a welding mandrel.

Referring now to FIG. 10, after the spar 48 has been placed on the layup mandrel 64 with the caps 62 underlying the cover 44, the layup mandrel 64 is replaced by a consolidation tool 66. The joints 57 between the spar 48 and the cover 44 are then consolidated using induction heating or other techniques which heat the joints 58 to the consolidation temperature of the particular thermoplastic being used, thereby co-consolidating the ends of the cover 44 with the caps 62 of the spar.

Figure 11:
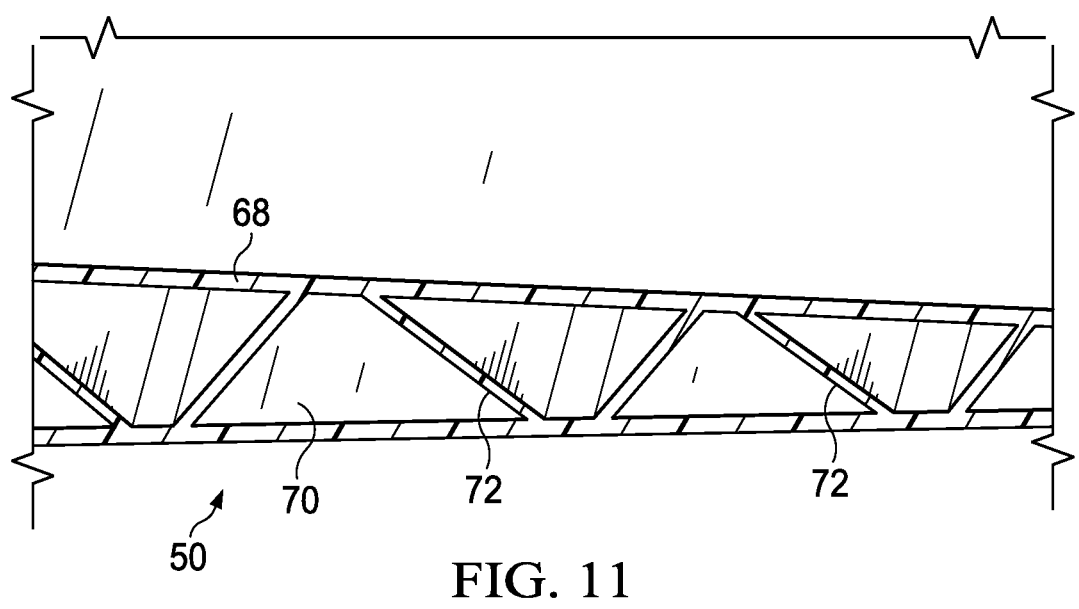
FIG. 11 is an illustration of an isometric view of a truss core forming part of the control surface of FIG. 2.
Figure 12:
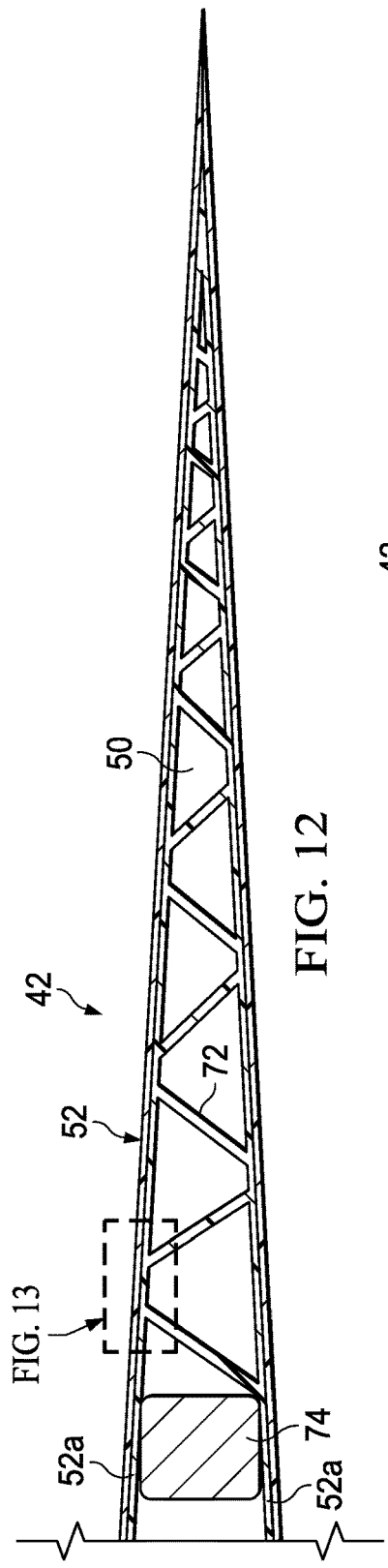
FIG. 12 is an illustration of a chordwise cross-sectional view of the aft section of the control surface.
Figure 12A:
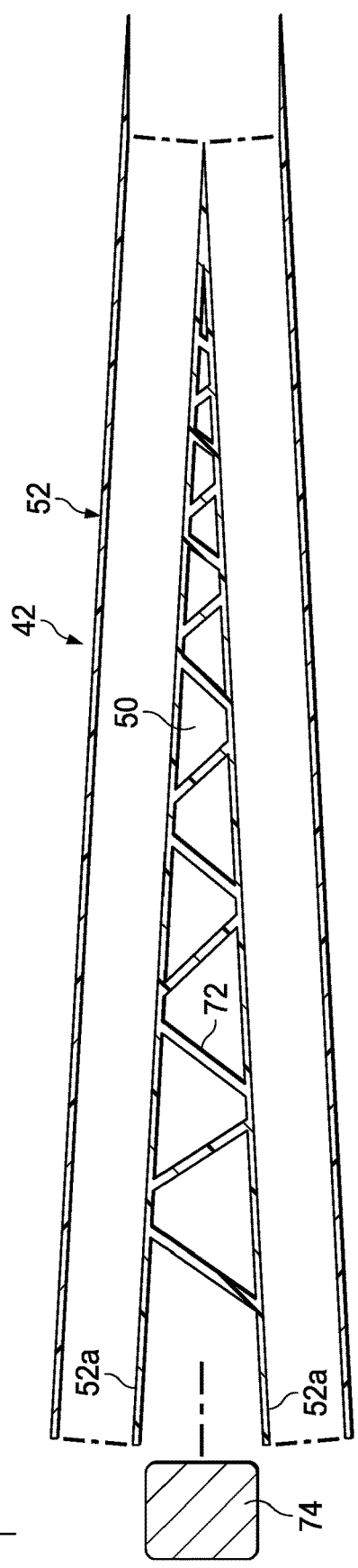
FIG. 12A is an illustration similar to FIG. 12 but with the parts exploded to more clearly show the outer skin relative to the truss core.
Figure 13:
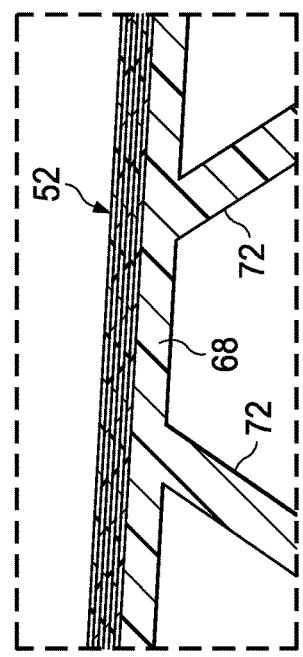
FIG. 13 is an illustration of the area designated as "FIG. 13" in FIG. 12.

Attention is now directed to FIGS. 11-13 which illustrate additional details of the aft section 42 of the control surface 36, including the truss core 50. As previously explained, the elements of the truss core 50 including the top and bottom chords 68, 70, along with the webs 72 are laid up using automatic tape laying (ATL) machines or automatic fiber placement (AFP) machines, depending upon whether fiber reinforced tape or tows are used. Following layup, mandrels (not shown) are inserted longitudinally in the openings between the webs 72, following which the truss core layup is placed in solid tooling and heated to consolidation temperature. Consolidation pressure applied through the heated tooling results in co-consolidation of the top chord 68, bottom chord 70 and webs 72 into a strong, thin, lightweight consolidated structure. The consolidated truss core 50 is then placed in appropriate tooling, which can include a layup mandrel 74 as shown in FIG. 11. Any desired number of fiber reinforced facesheets are then laid up over both the top and bottom chords 68, 70, thereby forming outer skins 52, including the previously mentioned tabs 52a.

Figure 16:
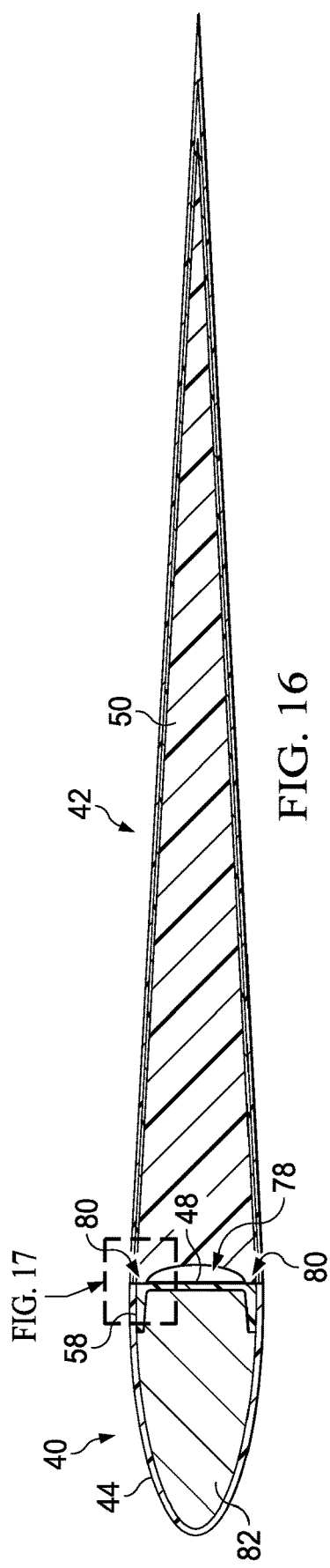
FIG. 16 is an illustration of a chordwise cross-sectional view showing the forward and aft sections of the control surface after being joined together.
Figure 17:
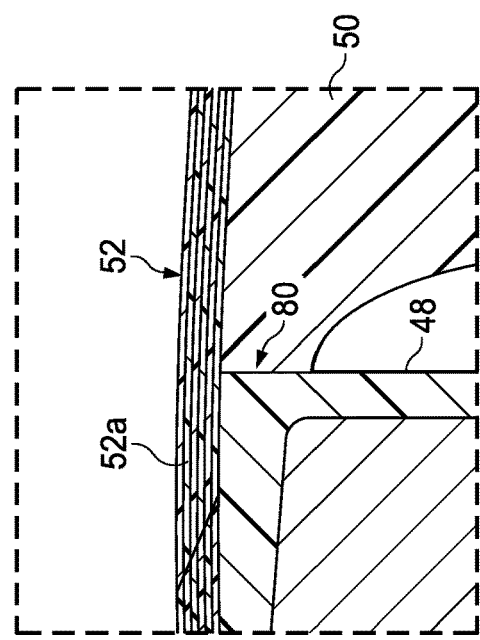
FIG. 17 is an illustration of the area designated as "FIG. 17" In FIG. 16.
Figure 18:
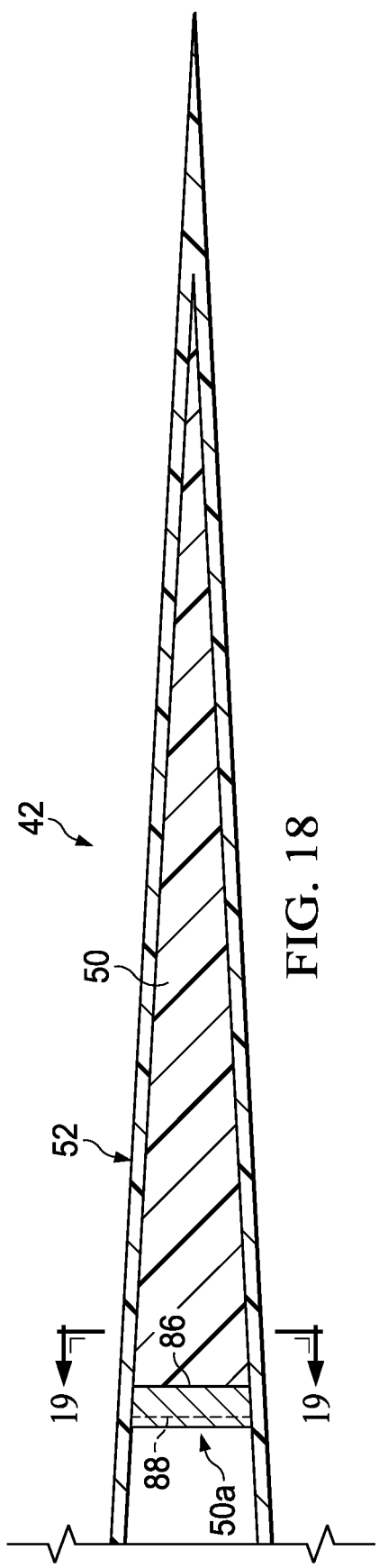
FIG. 18 is an illustration of a chordwise cross-sectional view of the aft section of the control surface, showing a slotted plate stabilizing the forward end of the truss core.

Referring now to FIGS. 14-16, in some examples, it is possible that the forward end of the truss core 50 is slightly uneven after consolidation, making it difficult to achieve full face-to-face contact between the truss core 50 and the spar 48 over a sufficient area. Consequently, it is necessary or desirable to form a cutout 78 in the forward end of the truss core 50 that has a fish mouth shape and defines two contact areas 80 on the truss core 50 that are configured to engage and be the joined to the spar 48. In the illustrated example, the two spaced apart contact areas 80 are respectively located at the top and bottom of the spar 48. However, in other examples, more than two contact areas is possible, and these defined contact areas are located elsewhere at the interface between the truss core 50 and the spar 48. FIG. 16 shows the aft section 42 of the control surface 36 positioned against the forward section 40 in preparation for connecting these two sections together along joints 58 between them. As can be seen in FIG. 17, because of the cutout 78, the spar 48 engages the entire contact area 80 of the truss core 50 in full face-to-face contact.

Figure 20:
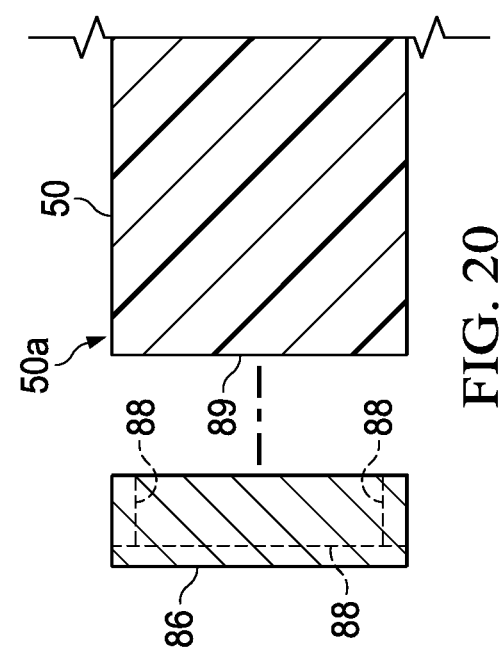
FIG. 20 is an illustration of an exploded, diagrammatic view showing how the forward end of the truss core is received within slots in the slotted plate shown in FIGS. 18 and 19.
Figure 19:
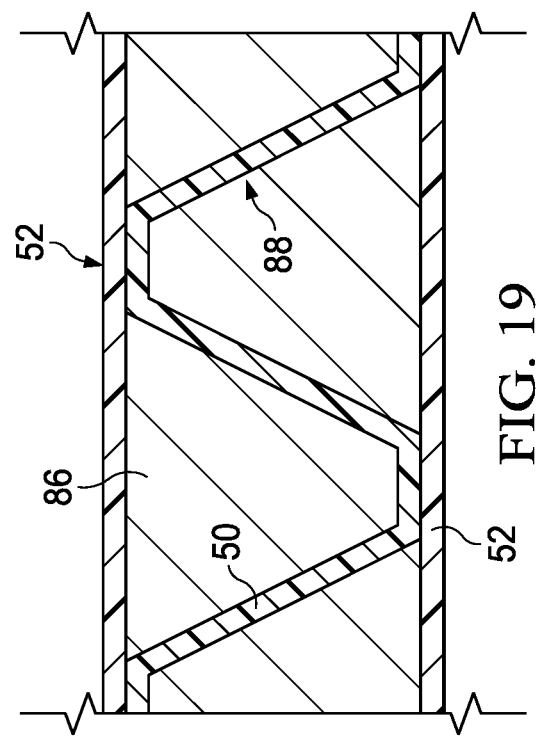
FIG. 19 is an illustration of a sectional view taken along the line 19-19 in FIG. 18.
Figure 21:
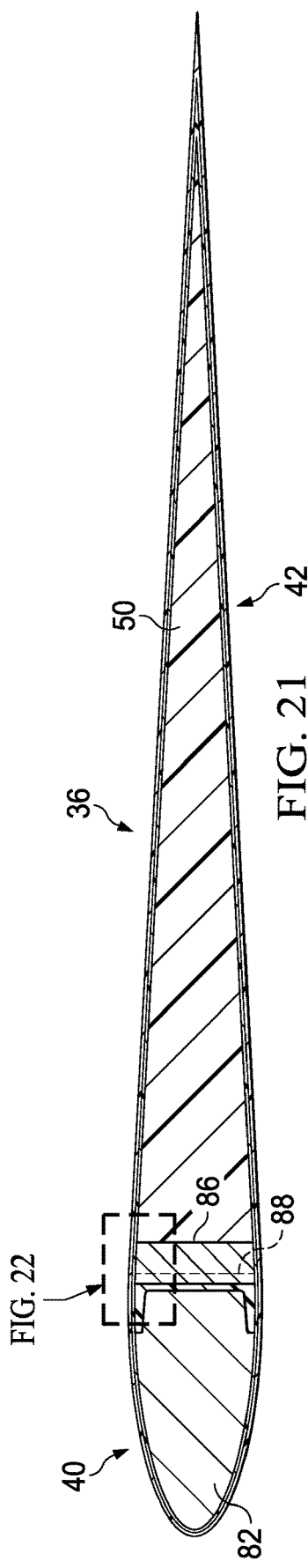
FIG. 21 is an illustration of a chordwise cross-sectional view of the control surface employing the slotted plates shown in FIG. 18-19.
Figure 22:
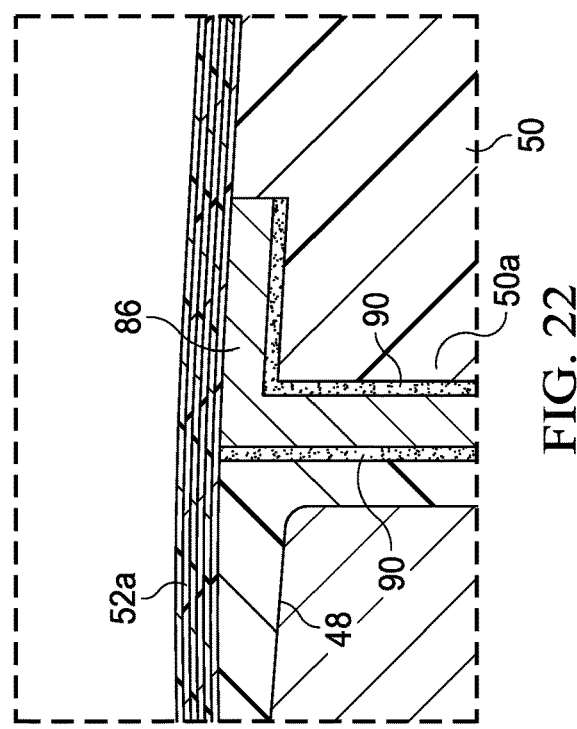
FIG. 22 is an illustration of the area designated as "FIG. 22" in FIG. 21.

In some applications where the webs 60 extend in the chordwise direction 56, the free forward end 50a of the truss core 50 is stabilized and supported. Referring to FIGS. 18-22, this support and stabilization is achieved using a slotted plate 86 formed of a fiber reinforced thermoplastic, or a light weight metal such as titanium. In one example, the slotted plate 86 is a laser sintered part produced by additive manufacturing. The slotted plate 86 extends spanwise 54 substantially the entire length L (FIG. 3) of the control surface 36 and includes slots 88 therein which form a slot configuration matching the cross-sectional shape of the forward end 50a of the truss core 50. As best seen in FIGS. 19, 20 and 21, the forward end 50a of the truss core 50 is closely received within the slots 88, resulting in the forward end 50a being stabilized and supported in the slotted plate 86. In one example, an adhesive 90 is used to join the forward end 50a of the truss core 50 to the slotted plate 86. Similarly, the slotted plate 86 is joined to the spar 48 by an adhesive 90. Alternatively, the forward end of the truss core 50 is joined to the slotted plate 86 by induction welding. Likewise, the slotted plate 86 is joined to the spar 48 by induction welding.

Figure 23:
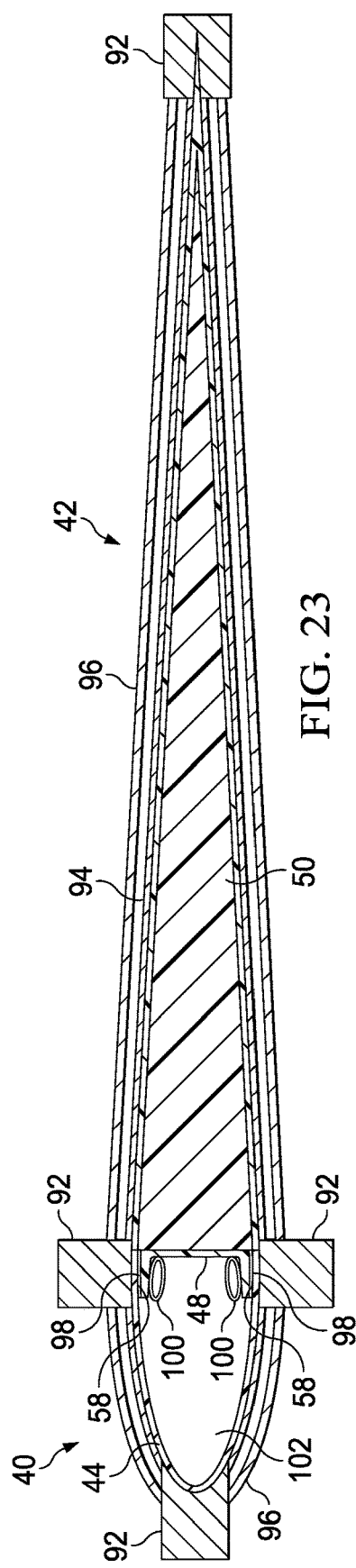
FIG. 23 is an illustration of a diagrammatic view showing how the forward and aft sections of the control surface are joined together using induction welding with smart susceptors

The forward and aft sections 40, 42 are connected together though localized welding at the joints 58 using an arrangement such as that shown diagrammatically in FIG. 23. In preparation for a welding operation, the assembled forward and aft sections 40, 42 are placed in tooling that is partially represented in FIG. 22 as restraints 92. The tooling includes a ferrite sheet 94 surrounded by an induction coil 96 coupled with a suitable source of AC electric power (not shown). Smart susceptors 118 are installed between inflatable bladders 100 and the joints 58 being welded. During the welding operation, the inflatable bladders 100 are inflated to apply consolidation pressure to the joints 58 which is reacted by the restraints 92.

Energizing the induction coil 96 creates an electromagnetic field (not shown) that induces eddy currents in the smart susceptors 98, causing the smart susceptors 98 to generate heat that melts the thermoplastic joints 58. In one example, the smart susceptors 98 are formed of ferromagnetic materials such as alloys of iron (Fe), nickel (Ni) or cobalt (Co), or ferrimagnetic materials such as, without limitation, ferrites. The material from which the smart susceptors 98 are formed is chosen to have a Curie temperature close to but slightly higher than the consolidation temperature of the thermoplastic forming the joints 58. The heat produced by the smart susceptors 98 decreases as the temperature increases to the Curie temperature, thereby preventing overheating of the joints 58 while ensuring adequate melting to allow full consolidation.

Figure 24:
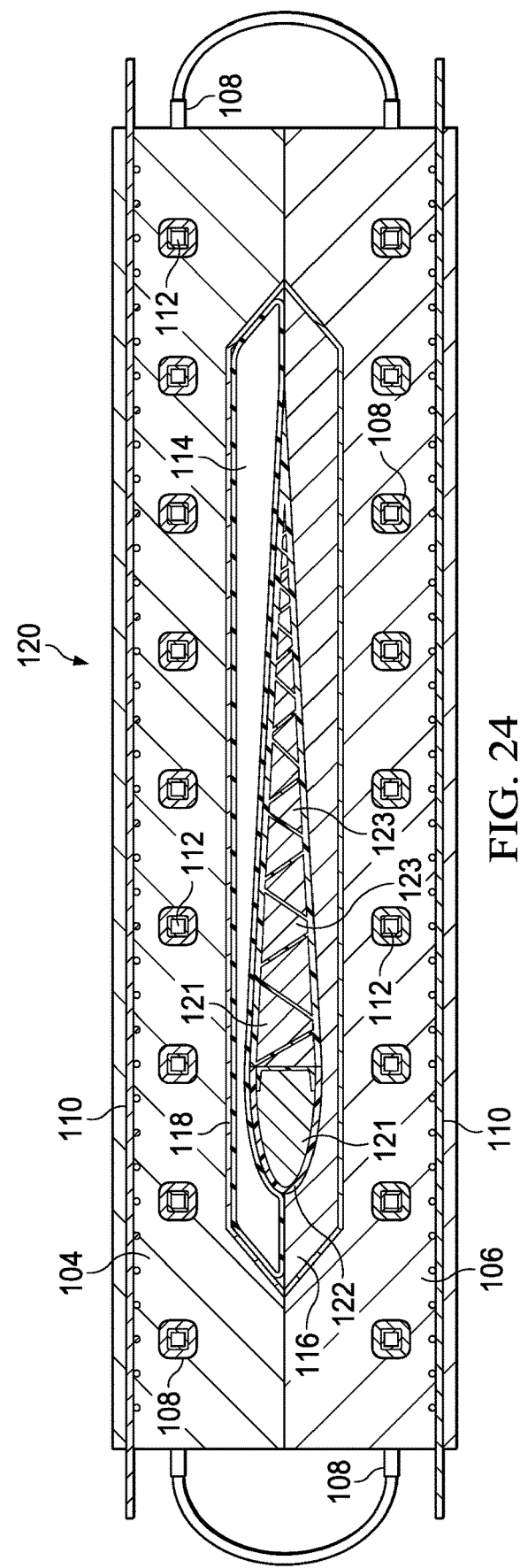
FIG. 24 is an illustration of a cross sectional view of apparatus for induction consolidation of the components of the control surface.

Attention is now directed to FIG. 24, which illustrates an induction consolidation assembly 120 that can be used to consolidate the components of the control surface 36 into a substantially unitary structure. Broadly, the induction consolidation assembly 120 comprise upper and lower dies 104, 106 respectively, pneumatically operated mandrels 121, a die insert 116 and an inflatable bladder 114. The upper and lower dies 104, 106 are formed of a nonconductive material such as ceramic, and the inflatable bladder 114 as well as the die insert 116 are formed of aluminum. The die insert 116 has a shape that complements that of the bottom of the control surface layup 122. The upper and lower dies 104, 106 have inner die surfaces that are lined with smart susceptors 118 formed of materials similar to the smart susceptors 98 described above in connection with FIG. 22. Each of the upper and lower dies 104, 106 includes suitable reinforcement rods 110, and are each provided with an internal electrical induction coil 108 that is coupled with a suitable source of AC power. Each of the upper and lower dies 104, 106 includes a means of cooling which, in the illustrated example, comprise fluid passageways 112 that are internal to the induction coil 108.

In use, with the upper and lower dies 104, 106 open (separated), the control surface layup 122 is placed in the die insert 116. In one example, automated equipment (not shown) such as pneumatic actuators is used to insert the mandrels 121 spanwise within the internal spaces 123 in the control surface layup 122 either before or after the control surface layup 122 is placed in the die insert 116. However, in other examples the mandrels 121 are manually inserted. With the control surface layup 122 in the die insert 116, the dies 104, 106 are closed, thereby sandwiching the control surface layup 122 between the die insert 116 and the inflatable bladder 114. The induction coil 108 is then energized to produce a magnetic field that induces the flow of eddy currents in the smart susceptor 118. These eddy currents result in the generation of heat which melts the thermoplastic components of the control surface layup 122. As these thermoplastic components begin to soften and melt, the inflatable bladder 114 is inflated to apply consolidation pressure to the control surface layup 122 until the consolidation temperature of the thermoplastic is reached. The Curie temperature of the materials from which the smart susceptor 118 are formed are selected to substantially equal or slightly exceed the desired consolidation temperature. Consequently, the consolidation temperature of the thermoplastic is not substantially exceeded because the smart susceptors 118 do not heat beyond their Curie temperature. Following heating of the control surface layup 122 to its consolidation temperature, the upper and lower dies 104, 106 are cooled, allowing the control surface layup 122 to cool and consolidate, following which the inflatable bladder 114 is deflated and the dies 104, 106 are separated to allow removal of the fully consolidated control surface layup 122.

Figure 25:
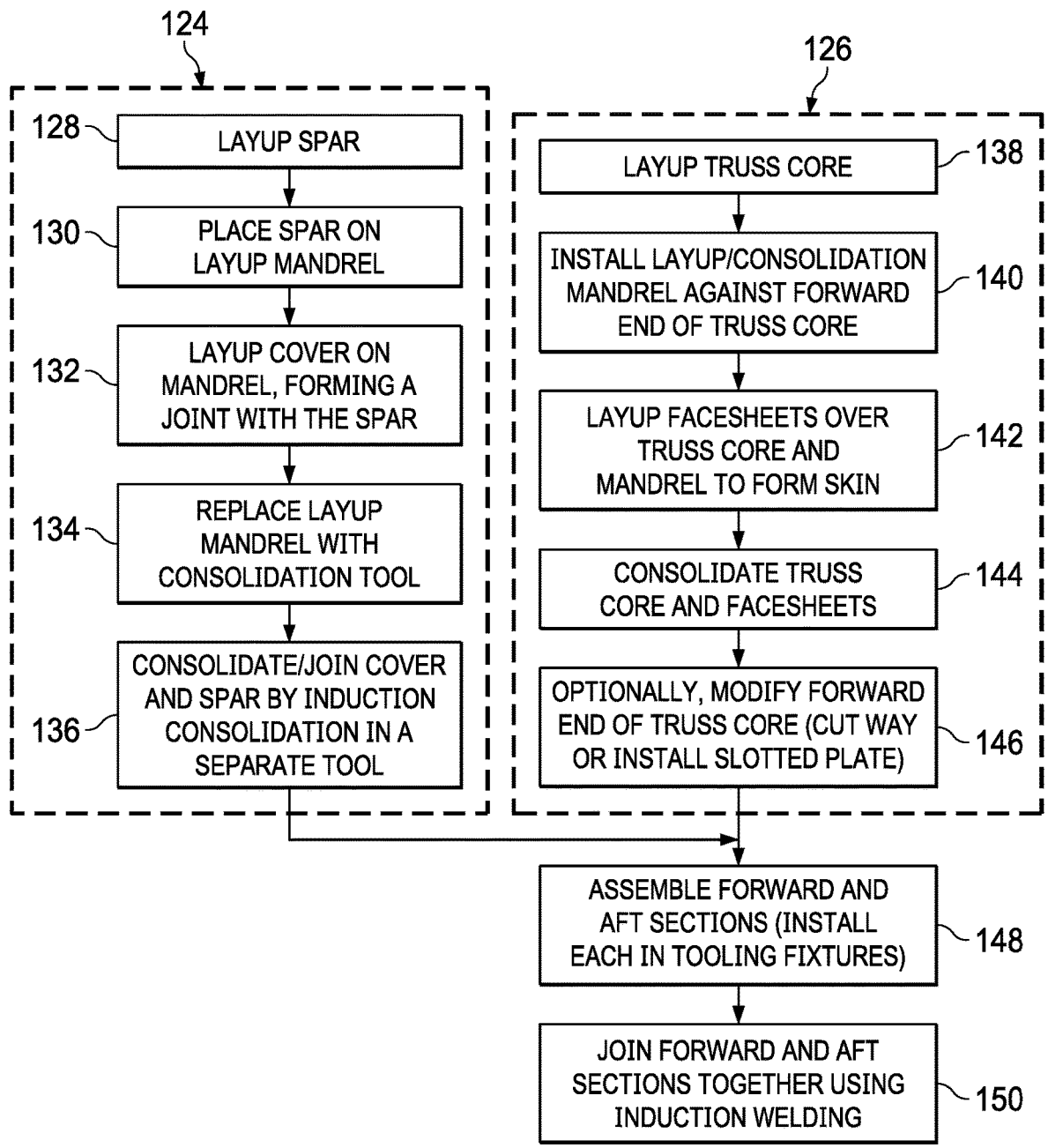
FIG. 25 is an illustration of a flow diagram of a method of making a control surface having a truss core extending in a spanwise direction.

FIG. 25 broadly illustrates the steps of a method of making a control surface 36 of the type described above in which the truss core 50 extends in the chordwise direction 56. The numeral 124 designates the steps followed to fabricate the forward section 40 of the control surface 36, while 126 designates the steps followed to fabricate the aft section 42. In one example, steps 124 and 126 are carried out independently of and in parallel with each other. Fabricating the forward section 40 begins at 128, in which the spar 48 is laid up as a preform, following which, at 130, the spar 48 is placed on a layup mandrel 64. In other examples, the spar 48 is laid up on the layup mandrel 64. At 132, the cover 44 is laid up over the layup mandrel 64, forming joints 58 between the spar 48 and the cover 44. In other examples, the cover 44 is laid up over the mandrel 64 before the spar 48 is placed on the mandrel 64. At 134, the layup mandrel 64 is replaced with a consolidation tool 66 and at 136, the cover 44 and spar 48 are consolidated and joined together by induction consolidation in a separate tool. In other examples, the cover 44 and spar 48 are each laid up as a preform and then assembled together on the consolidation tool 66 before being consolidated through induction heating.

Fabrication of the aft section 42 begins at 138 in which the truss core 50 is laid up. At 140, a layup mandrel 74 is placed against the forward end of the truss core 50, following which at 142 any number of facesheet plies are laid up over the truss core 50 to form an outer skin 52 which includes forwardly extending tabs 52*a*. At 144 the truss core 50 and facesheet plies are co-consolidated. Depending on the application, optionally at 146, the forward end 50*a* of the truss core 50 is modified either by cutting away a portion thereof to form contact areas 80, or by fabricating and installing a slotted plate 86 to stabilize and support the forward end of the truss core 50. At 148, the forward and aft sections 40, 42 are assembled together and placed in tooling fixtures. Finally, at 150, the forward and aft sections 40, 42 are joined together by localized induction welding.

Figure 26:
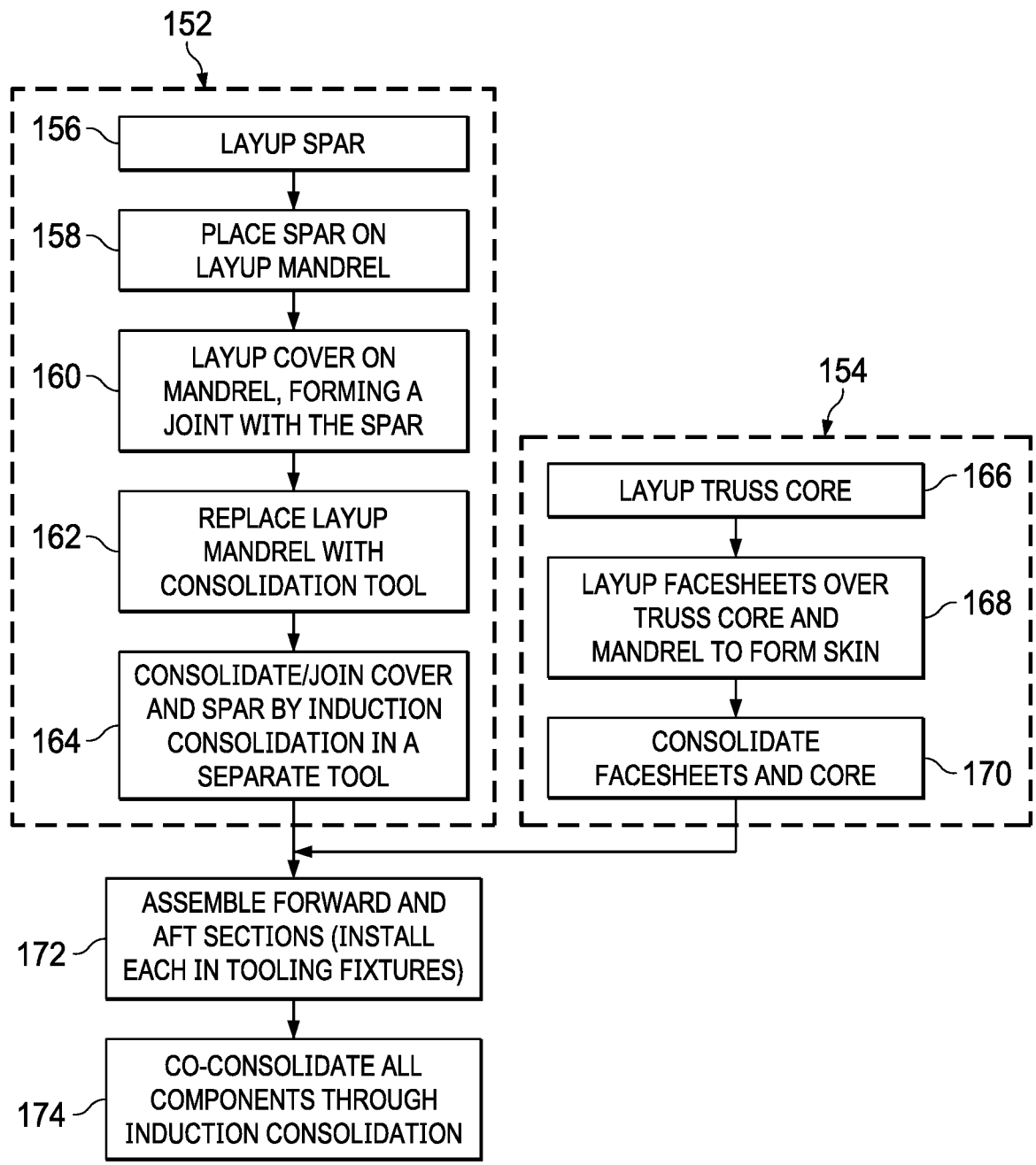
FIG. 26 is an illustration of a flow diagram of a method of making a control surface having a truss core extending in a chordwise direction.

FIG. 26 broadly illustrates the steps of a method of making a control surface 36 of the type described above in which the truss core 50 extends in the spanwise direction 54. Numeral 152 designates the steps followed to fabricate the forward section 40 of the control surface 36, while 154 designates the steps followed in fabricating the aft section 42. Referring to steps 152, the process of producing the forward section 40 begins at 156 with laying up the spar 48. Then at 158, the spar 48 is placed on a layup mandrel 64, following which at 160 the cover 44 is laid up on the layup mandrel 64 in a manner that forms a joint 58 between the cover 44 and the spar 48. At 162, the mandrel 64 is replaced with a consolidation tool 66, and at 164 the cover 44 and spar 48 are joined together and co-consolidated by induction consolidation in separate tools. The steps for producing the aft section 42 shown at 154 begin at 166 with laying up the truss core 50. Then, at 168 the facesheets are laid up over the truss core 50 and the mandrel 64, thereby forming a skin 52. Finally, at 170, the facesheets and truss core 50 are co-consolidated. At 172, the forward and aft sections 40, 42 are assembled together by installing each of them in tooling fixtures. Then at 174, the forward and aft sections 40, 42 are joined together through co-consolidation, using induction consolidation. In one variation of the method, it can be possible to eliminate the consolidation steps 164 and 170, by consolidating the cover 44, spar 48, and forward and aft sections 40, 42 at the same time all in a single consolidation step 174. As previously indicated, consolidation of the truss core 50 as well as co-consolidation of the components in step 174 are carried out using solid tooling.

Figure 27:
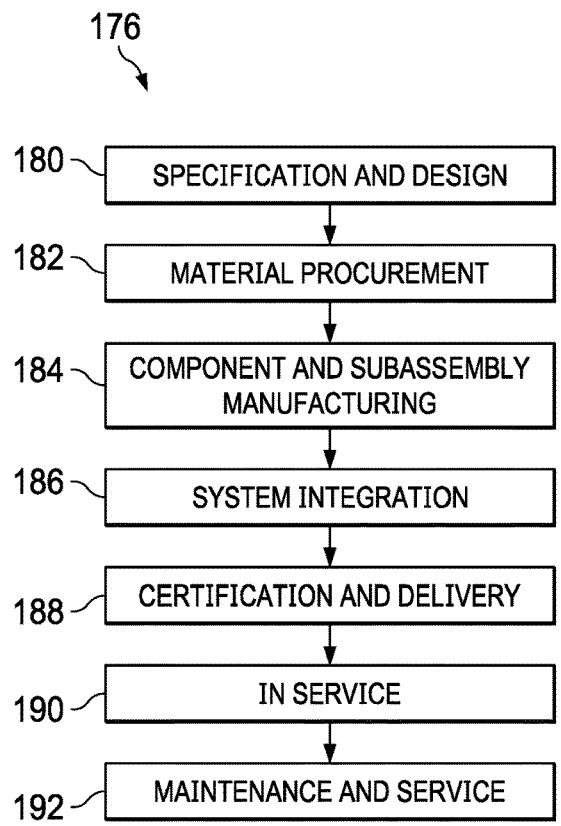
FIG. 27 is an illustration of a flow diagram of aircraft production and service methodology.
Figure 28:
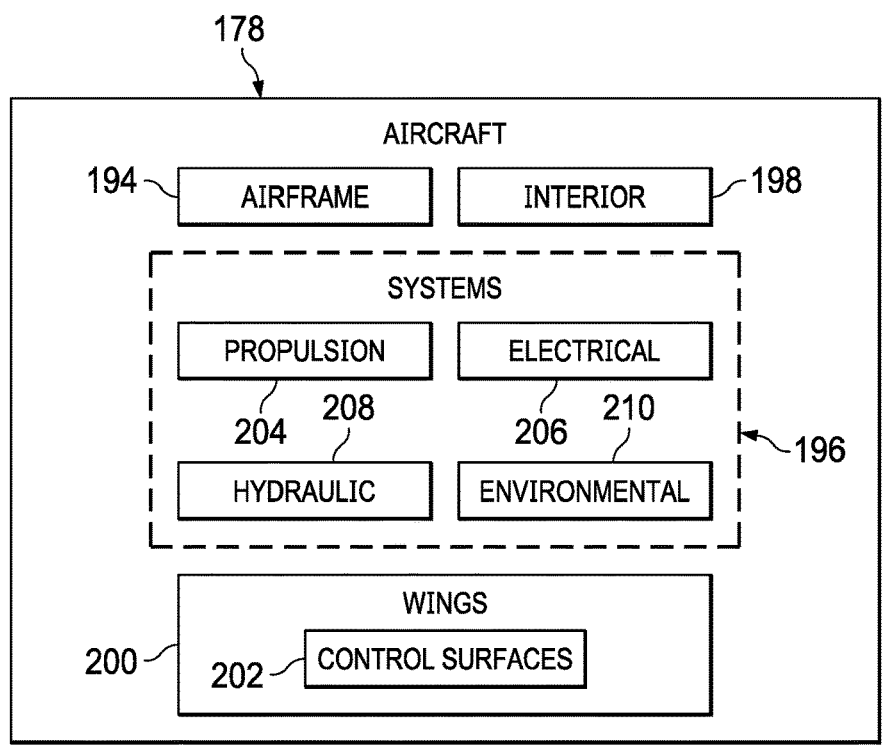
FIG. 28 is an illustration of a block diagram of an aircraft.

Examples of the disclosure find use in a variety of potential applications, particularly in the transportation industry, including for example, aerospace, marine, automotive applications and other application where strong, then lightweight structures such as control surfaces in aircraft are used. Thus, referring now to FIGS. 27 and 28, examples of the disclosure can be used in the context of an aircraft manufacturing and service method 176 as shown in FIG. 27 and an aircraft 178 as shown in FIG. 28. Aircraft applications of the disclosed examples include a variety of control surfaces such as rudders, elevators, ailerons, elevons and flapperons. During pre-production, exemplary method 176 includes specification and design 180 of the aircraft 178 and material procurement 182. During production, component and subassembly manufacturing 184 and system integration 186 of the aircraft 178 takes place. Thereafter, the aircraft 178 goes through certification and delivery 188 in order to be placed in service 190. While in service by a customer, the aircraft 178 is scheduled for routine maintenance and service 192, which includes modification, reconfiguration, refurbishment, and so on.

Each of the processes of method 176 is performed or carried out by any of a system integrator, a third party, and/or an operator (e.g., a customer). For the purposes of this description, a system integrator includes without limitation any number of aircraft manufacturers and major-system subcontractors; a third party can include without limitation any number of vendors, subcontractors, and suppliers; and an operator includes an airline, leasing company, military entity, service organization, and so on.

As shown in FIG. 28, the aircraft 178 produced by exemplary method 176 includes an airframe 194 with a plurality of systems 196, an interior 198 and wings 200. The wings 200 includes any number of control surfaces 202. Examples of high-level systems 196 include one or more of a propulsion system 204, an electrical system 206, a hydraulic system 208 and an environmental system 210. Any number of other systems is possible. Although an aerospace example is shown, the principles of the disclosure apply to other industries, such as the marine and automotive industries.

It is possible to employ systems and methods embodied herein during any one or more of the stages of the aircraft manufacturing and service method 176. For example, it is possible to fabricate or manufacture components or subassemblies corresponding to production process 184 in a manner similar to components or subassemblies produced while the aircraft 178 is in service. Also it is possible to utilize one or more apparatus examples, method examples, or a combination thereof during the production processes 184 and 186, for example, by substantially expediting assembly of or reducing the cost of an aircraft 178. Similarly, it is possible to utilize one or more of apparatus examples, method examples, or a combination thereof while the aircraft 178 is in service, for example and without limitation, to maintenance and service 182.

As used herein, the phrase "at least one of", when used with a list of items, means different combinations of one or more of the listed items can be used and only one of each item in the list can be needed. For example, "at least one of item A, item B, and item C" can include, without limitation, item A, item A and item B, or item B. This example also can include item A, item B, and item C or item B and item C. The item can be a particular object, thing, or a category. In other words, at least one of means any combination items and number of items can be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples can provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of making a control surface for an aircraft, comprising:
   fabricating a first section of the control surface, including fabricating a cover, fabricating a spar, and attaching the spar to the cover;
   fabricating a second section of the control surface, including fabricating a truss core, and applying a skin over the truss core;
   fabricating a plate having slots therein configured to receive portions of the truss core,
   inserting the portions of the truss core into the slots,
   adhesively bonding the portions of the truss core with the plate; and
   assembling the first and second sections together.

2. The method of claim 1, wherein:
   fabricating the cover includes laying up plies of fiber reinforced thermoplastic fabric over a layup mandrel, fabricating the spar includes laying up plies of a fiber reinforced thermoplastic tape, and
   attaching the spar to the cover.

3. The method of claim 2, wherein attaching the spar to the cover is performed using induction consolidation.

4. The method of claim 1, wherein:
   fabricating the truss core includes laying up webs, a top chord and a bottom chord, and co-consolidating the webs and the top chord and the bottom chord, and
   applying the skin includes laying up plies of a fiber reinforced thermoplastic fabric over the top chord and the bottom chord.

5. The method of claim 1, wherein assembling the first and second sections together is performed using induction consolidation.

6. The method of claim 1, wherein assembling the first and second sections together is performed by induction consolidation using smart susceptors.

7. The method of claim 1, wherein assembling the first and second sections together is performed by induction welding.

8. A method of making a control surface for an aircraft, comprising:
   fabricating a cover, a spar, and a truss core;
   applying a skin over the truss core;
   welding the cover and the spar together;
   joining the skin to the cover;
   fabricating a plate having slots therein configured to receive portions of the truss core;
   inserting the portions of the truss core into the slots; and
   adhesively bonding the portions of the truss core with the plate.

9. The method of claim 8, further comprising:
   joining the cover and spar with the truss core and the skin by induction consolidation.

10. The method of claim 8, wherein:
    fabricating the cover includes laying up plies of fiber reinforced thermoplastic fabric over a layup mandrel; and
    fabricating the spar includes laying up plies of a fiber reinforced thermoplastic tape.

11. The method of claim 8, wherein welding the cover to the spar is performed using induction consolidation.

12. The method of claim 8, wherein:
    fabricating the truss core includes laying up webs, a top chord and a bottom chord, and co-consolidating the webs and the top chord and the bottom chord, and
    applying the skin includes laying up plies of a fiber reinforced thermoplastic fabric over the top chord and the bottom chord.

13. The method of claim 8, further comprising:
    fabricating a first section of the control surface including the cover and the spar;
    fabricating a second section of the control surface including the truss core and the skin; and
    assembling the first and second sections together.

14. The method of claim 13, wherein assembling the first and second sections together is performed using induction consolidation.

15. The method of claim 13, wherein assembling the first and second sections together is performed by induction consolidation using smart susceptors.

16. The method of claim 13, wherein assembling the first and second sections together is performed by induction welding.

17. The method of claim 1, further comprising:
    joining the slotted plate to the spar.

18. A method of making a control surface for an aircraft, comprising:
- fabricating a first section of the control surface, including fabricating a cover, fabricating a spar, and attaching the spar to the cover;
- fabricating a second section of the control surface, including fabricating a truss core, and applying a skin over the truss core;
- forming a cutout in a front face of the truss core defining contact areas in the front face of the truss core configured to contact and be joined to the spar; and
- assembling the first and second sections together.

19. The method of claim 18, wherein the assembling the first and second sections together comprises joining the contact areas in face-to-face contact with the spar.

20. The method of claim 18, wherein:
- fabricating the cover includes laying up plies of fiber reinforced thermoplastic fabric over a layup mandrel; and
- fabricating the spar includes laying up plies of a fiber reinforced thermoplastic tape.

21. The method of claim 18, wherein attaching the spar to the cover is performed using induction consolidation.

22. The method of claim 18, wherein:
- fabricating the truss core includes laying up webs, a top chord and a bottom chord, and co-consolidating the webs and the top chord and the bottom chord, and
- applying the skin includes laying up plies of a fiber reinforced thermoplastic fabric over the top chord and the bottom chord.

23. The method of claim 18, wherein assembling the first and second sections together is performed using induction consolidation.

24. The method of claim 18, wherein assembling the first and second sections together is performed by induction consolidation using smart susceptors.

25. The method of claim 18, wherein assembling the first and second sections together is performed by induction welding.

* * * * *